(12) United States Patent
Mabuchi

(10) Patent No.: US 9,402,038 B2
(45) Date of Patent: Jul. 26, 2016

(54) SOLID-STATE IMAGING DEVICE AND METHOD OF DRIVING COMPRISING A FIRST AND SECOND ACCUMULATION SECTIONS FOR TRANSFERRING CHARGES EXCEEDING THE SATURATION AMOUNT

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 13/482,631

(22) Filed: May 29, 2012

(65) Prior Publication Data

US 2012/0326010 A1 Dec. 27, 2012

(30) Foreign Application Priority Data

Jun. 21, 2011 (JP) ................................. 2011-137652

(51) Int. Cl.
*H04N 5/217* (2011.01)
*H04N 5/335* (2011.01)
*H01L 27/00* (2006.01)
*H01J 40/14* (2006.01)
*H04N 5/353* (2011.01)
*H04N 5/359* (2011.01)
*H04N 5/3745* (2011.01)

(52) U.S. Cl.
CPC .............. *H04N 5/353* (2013.01); *H04N 5/359* (2013.01); *H04N 5/3591* (2013.01); *H04N 5/37457* (2013.01)

(58) Field of Classification Search
CPC .............. H04N 3/3591; H04N 5/3745; H04N 5/37455; H04N 5/37457; H04N 5/3532; H04N 5/374; H04N 5/3592; H04N 5/3595; H04N 5/353; H01L 27/14609; H01L 27/14612; H01L 27/14643; H01L 27/146; H01L 27/14887

USPC ........ 250/208.1, 214 R, 214.1, 206; 348/241, 348/248, 296, 297, 298, 299, 300, 301, 302, 348/308; 257/257, 258, 290–292, 225, 229, 257/230
See application file for complete search history.

(56) References Cited

U.S. PATENT DOCUMENTS

| 7,800,675 | B2* | 9/2010 | Shah ............................. 348/308 |
| 2006/0266922 | A1* | 11/2006 | McGrath et al. ............ 250/208.1 |
| 2009/0095986 | A1* | 4/2009 | Neukom ....................... 257/225 |
| 2009/0251582 | A1 | 10/2009 | Oike |
| 2010/0091157 | A1* | 4/2010 | Yamashita et al. ............ 348/300 |
| 2010/0188543 | A1* | 7/2010 | Oike ............................. 348/308 |

FOREIGN PATENT DOCUMENTS

JP 2009-268083 11/2009

* cited by examiner

*Primary Examiner* — Thanh Luu
*Assistant Examiner* — Jennifer Bennett
(74) *Attorney, Agent, or Firm* — Chip Law Group

(57) ABSTRACT

A solid-state imaging device includes: a pixel array section including an array of pixels in a two-dimensional matrix, the pixels including a photoelectric conversion section configured to generate signal charges in accordance with an amount of light, a discharge section configured to receive an overflow of signal charges exceeding a saturation amount of charges during an exposure period, at least a first charge accumulation section configured to receive the signal charges generated by the photoelectric conversion section after the exposure period, and a second charge accumulation section configured to receive the signal charges exceeding the saturation amount of charges, and a plurality of pixel transistors reading the signal charges; and a scanning section configured to scan the pixels so that accumulation periods for all the pixels are simultaneous in an accumulation period of the signal charges, and to selectively scan the pixels in sequence.

16 Claims, 12 Drawing Sheets

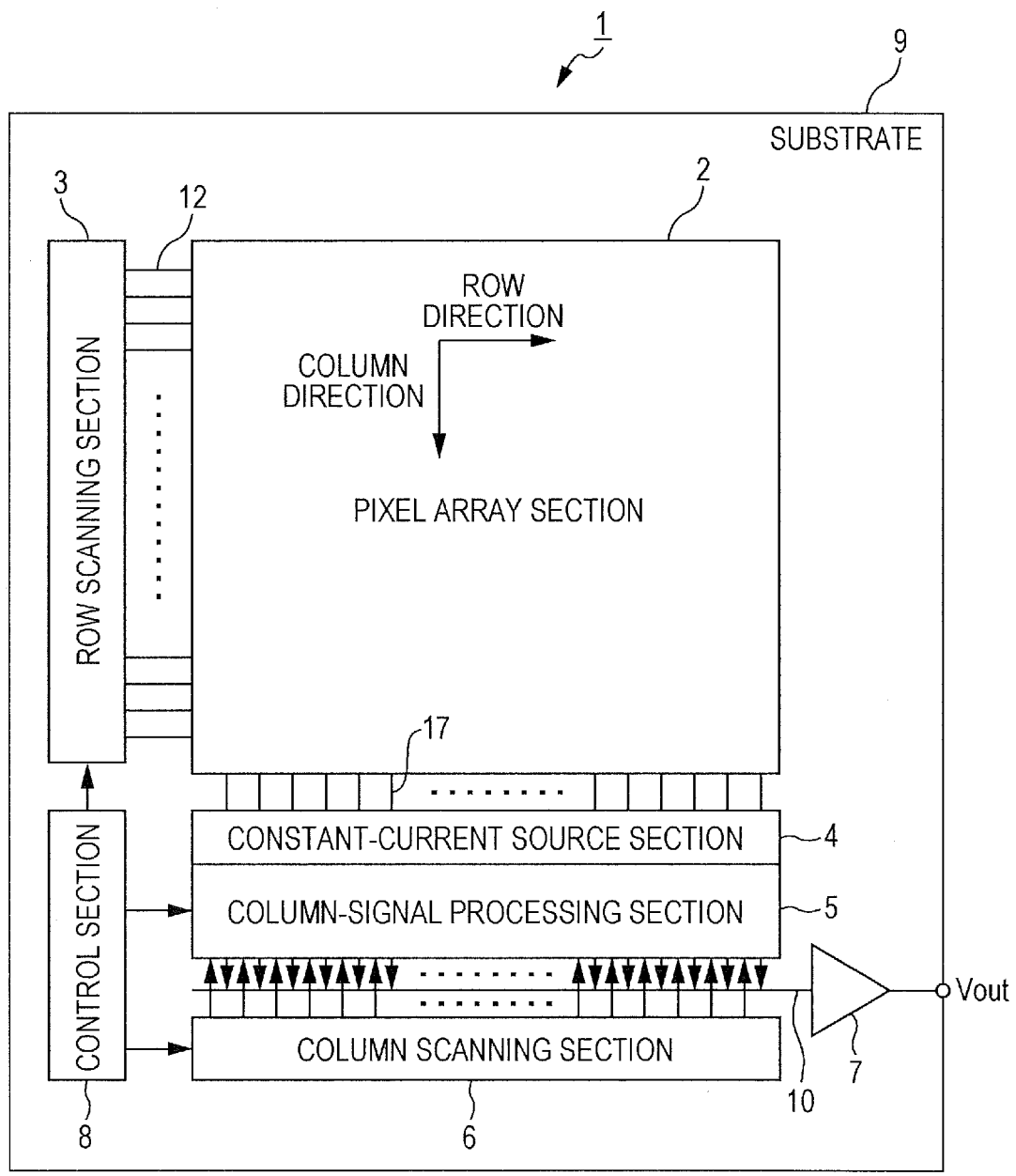

SOLID-STATE IMAGING DEVICE AND METHOD OF DRIVING COMPRISING A FIRST AND SECOND ACCUMULATION SECTIONS FOR TRANSFERRING CHARGES EXCEEDING THE SATURATION AMOUNT

BACKGROUND

The present disclosure relates to solid-state imaging devices. More particularly, the present disclosure relates to a CMOS solid-state imaging device, a method of driving the CMOS solid-state imaging device, and an electronic system using the CMOS solid-state imaging device.

To date, in a general CMOS solid-state imaging device, a method of reading signal charges, which have been generated and accumulated by light receiving sections of individual pixels disposed in a two-dimensional matrix, for each row in sequence has been employed. In this case, exposure time of the light receiving sections of the individual pixels is determined by a start and an end of readout of signal charges, and thus exposure timing differs for each pixel. Accordingly, if an image of a fast-moving subject is captured using such a CMOS solid-state imaging device, there has been a problem in that the image of the subject is deformed.

In order to address the above-described problem, in recent years, proposals have been made on a simultaneous image capturing function (global shutter function) for achieving uniformity in accumulating period. Also, CMOS solid-state imaging devices having a global shutter function have been expanding in application.

In a CMOS solid-state imaging device having a global shutter function, in order to accumulate signal charges generated by a light receiving section until readout time, it is normally necessary to have a charge accumulation section with a light-shielding effect. For the charge accumulation section, there are many normal CMOS solid-state imaging devices that use a floating diffusion section, which is originally disposed for a pixel. Also, Japanese Unexamined Patent Application Publication No. 2009-268083 has disclosed a configuration of using two sections, namely a CCD-type charge holding capacitor section and a floating diffusion section for a charge accumulation section in order to increase a number of saturated electrons.

Incidentally, the CCD-type charge holding capacitor section described in Japanese Unexamined Patent Application Publication No. 2009-268083 is also used for a receiver of signal charges that has overflowed from a photodiode during an exposure period. Accordingly, exposure is not allowed while the charge holding capacitor section holds signal charges. Accordingly, exposure is allowed only after signal charges of all the pixels are read out. Thus, there has been a problem in that there are many periods in which exposure is not allowed, a smooth moving image that demands continuous exposure is not allowed, and sensitivity of a moving image is deteriorated.

SUMMARY

In view of the above-described points, it is desirable to provide a solid-state imaging device having a global shutter function that allows continuous exposure. Also, it is desirable to provide an electronic system using the solid-state imaging device.

According to an embodiment of the present disclosure, there is provided a solid-state imaging device including a pixel array section formed in a two-dimensional matrix and a scanning section. The pixel array section includes pixels having a photoelectric conversion section, a discharge section, at least two charge accumulation sections including a first charge accumulation section and a second charge accumulation section, and a pixel transistor. The photoelectric conversion section is configured to generate signal charges in accordance with an amount of light. The discharge section is configured to receive an overflow of signal charges exceeding a saturation amount of charges in the photoelectric conversion section out of the signal charges generated by the photoelectric conversion section during an exposure period. At least two charge accumulation sections include a first charge accumulation section that is configured to receive transfer of the signal charges generated by the photoelectric conversion section after the exposure period and a second charge accumulation section that is configured to receive transfer of the signal charges exceeding the saturation amount of charges. The pixel transistor transfers and reads the signal charges. The scanning section is configured to scan the pixels such that the accumulation period for all the pixels are simultaneous in an accumulation period of the signal charge, and to selectively scan the pixels in sequence.

In a solid-state imaging device according to the present disclosure, signal charges generated and accumulated by the photoelectric conversion sections are transferred to the first charge accumulation sections simultaneously for all the pixels, and then read out for each pixel. Thereby, it is possible to start a next exposure period before a signal-charge readout period is ended.

According to another embodiment of the present disclosure, there is provided a method of driving a solid-state imaging device. The method includes: starting exposure by the photoelectric conversion section simultaneously for all the pixels, and generating and accumulating the signal charges; transferring the signal charges accumulated in the photoelectric conversion section to the first charge accumulation section simultaneously for all the pixels; reading out the signal charges transferred to the second charge accumulation section in excess of the saturation amount of charges in the first charge accumulation section as a high luminance signal, resetting potential of the second charge accumulation section, and then transferring the signal charges accumulated in the first charge accumulation section to the second charge accumulation section, and reading out the signal charges accumulated in the second charge accumulation section as a low luminance signal for each pixel.

In a method of driving a solid-state imaging device according to the present disclosure, signal charges generated and accumulated by the photoelectric conversion section are transferred to the first charge accumulation section simultaneously for all the pixels, and then read out for each pixel. Thereby, it is possible to start a next exposure period before a signal-charge readout period is ended.

According to another embodiment of the present disclosure, there is provided an electronic system including a solid-state imaging device having a pixel array section and a scanning section. The pixel array section includes pixels having a photoelectric conversion section, a discharge section, at least two charge accumulation sections including a first charge accumulation section and a second charge accumulation section, and a pixel transistor. The photoelectric conversion section is configured to generate signal charges in accordance with an amount of light. The discharge section is configured to receive an overflow of signal charges exceeding a saturation amount of charges in the photoelectric conversion section out of the signal charges generated by the photoelectric conversion section during an exposure period. At least two charge accumulation sections include a first charge accumulation section that is configured to receive transfer of the signal charges generated by the photoelectric conversion section after the exposure period and a second charge accumulation section that is configured to receive transfer of the signal charges exceeding the saturation amount of charges. The pixel transistor transfers and reads the signal charges. The pixel array section is formed in which the pixels are arrayed in a two-dimensional matrix. The scanning section is configured to scan the pixels such that the accumulation period for all the pixels are simultaneous in an accumulation period of the signal charges, and to selectively scan the pixels in sequence. All the pixels may be simultaneously scanned instead of being scanned in sequence.

By the present disclosure, in a solid-state imaging device having a global shutter function, it is possible to start exposure before readout is ended, and thus quality of moving images is improved.

BRIEF DESCRIPTION OF THE DRAWINGS

FIG. 1 is a schematic configuration diagram illustrating an overall CMOS solid-state imaging device according to a first embodiment of the present disclosure;

DETAILED DESCRIPTION OF EMBODIMENTS

Figure 2A:
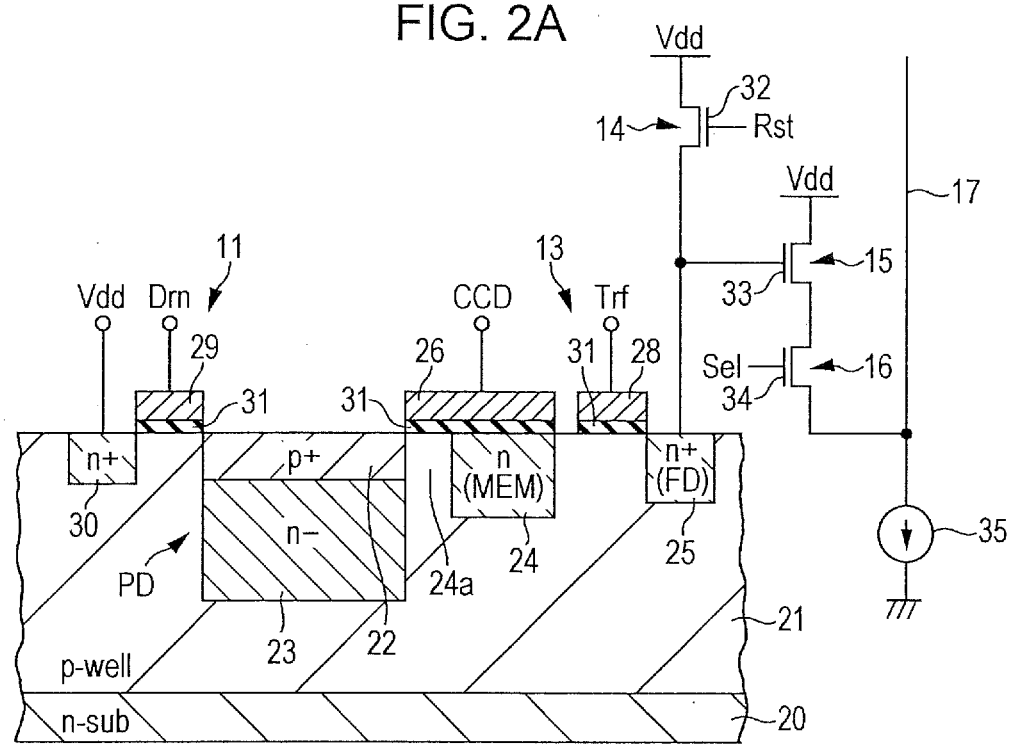
FIGS. 2A and 2B are diagrams illustrating a cross-sectional configuration (a part thereof is illustrated by a circuit diagram) of a pixel array section of a solid-state imaging device according to the first embodiment of the present disclosure, and a circuit configuration of a pixel, respectively.

In the following, a description will be given of an example of a solid-state imaging device according to embodiments of the present disclosure, a method of driving a solid-state imaging device, and an electronic system with reference to FIG. 1 to FIG. 12. The embodiments of the present disclosure will be described in the following order. In this regard, the present disclosure is not limited to the following example.

1. First embodiment: solid-state imaging device
 1.1 Overall configuration of solid-state imaging device
 1.2 Configuration of main part
 1.3 Driving method
 1.4 Variation
2. Second embodiment: solid-state imaging device electronic system
 2.1 Pixel configuration
 2.2 Configuration of electronic system
 2.3 Driving method: still image
 2.4 Driving method: moving image 1. First Embodiment Solid-State Imaging Device 1.1 Overall Configuration of Solid-State Imaging Device First, a description will be given of a solid-state imaging device according to a first embodiment of the present disclosure.

FIG. 1 is a schematic configuration diagram illustrating an overall CMOS solid-state imaging device according to the first embodiment of the present disclosure.

A solid-state imaging device 1 according to the present embodiment has a configuration including a pixel array section 2 formed on a substrate 9 made of silicon, and a peripheral circuit section integrated on a same substrate 9 as that of the pixel array section 2. The peripheral circuit section includes, for example, a row scanning section 3, a constant-current source section 4, a column-signal processing section 5, a column scanning section 6, an output processing section 7, and a control section 8, etc.

The pixel array section 2 has a configuration in which a unit pixel (hereinafter, sometimes referred to simply as a "pixel") having a photoelectric conversion element that generates an amount of photocharges (light signal) in accordance with an amount of incident light and accumulates the photocharges inside is disposed in the row direction and in the column direction, that is to say, in a two-dimensional matrix. Here, the row direction means an arrangement direction of pixels in a pixel row (that is to say, the horizontal direction), and the column direction means an arrangement direction of pixels in a pixel column (that is to say, the vertical direction). A description will be given later of details of a specific circuit configuration of the unit pixel.

In the pixel array section 2, a pixel drive line 12 is wired to a matrix-state pixel array for each pixel row in the row direction, and a vertical signal line 17 is wired to the matrix-state pixel array for each pixel column in the column direction. The pixel drive line 12 transmits a drive signal for driving at the time of reading a signal from a pixel. In FIG. 1, one pixel drive line 12 is illustrated by one wire line, but is not limited to one line. One end of the pixel drive line 12 is connected to an end terminal corresponding to each row of the row scanning section 3.

The row scanning section 3 includes a shift register, an address decoder, etc., and drives each pixel of the pixel array section 2 simultaneously for all the pixels, or for each row, etc. That is to say, the row scanning section 3 constitutes a drive section that drives each pixel of the pixel array section 2 together with the control section 8 that controls the row scanning section 3. A specific configuration of the row scanning section 3 is omitted from the illustration. In general, the row scanning section 3 has a configuration including two scanning systems, namely, a read scanning system and a sweep scanning system.

The read scanning system performs selective scanning on unit pixels of the pixel array section 2 for each row in sequence in order to read signals from the unit pixels. The signals that are read from the unit pixels are analog signals. The sweep scanning system performs sweep scanning on a row from which read scanning is performed by the read scanning system.

The sweep scanning is performed by the sweep scanning system so that unnecessary charges are swept away from photoelectric conversion elements of the unit pixels in the read row, and thereby the photoelectric conversion elements are reset. And so-called electronic shutter operation is performed by the sweep scanning system sweeping unnecessary charges (reset). Here, the electronic shutter operation means operation to discard photocharges of the photoelectric conversion element, and to start new exposure (start accumulation of photocharges) operation.

Descriptions will be given of pixel scanning performed by the read scanning system and the sweep scanning system later.

The signal output from each unit pixel in the pixel row having been subjected to the selective scanning performed by the row scanning section 3 is input into the column-signal processing section 5 through a corresponding one of the vertical signal lines 17 for each pixel column via the constant-current source section 4. The constant-current source section 4 has a configuration in which a constant current source 35 (refer to FIGS. 2A and 2B) is disposed for each pixel column. The constant current source 35 supplies a bias current to each unit pixel through a corresponding one of the vertical signal lines 17.

The column-signal processing section 5 performs predetermined signal processing on the signal output from each pixel of the selected row of the pixel array section 2 for each pixel column through the vertical signal line 17. The signal processing performed by the column-signal processing section 5 includes, for example, noise elimination processing by CDS (Correlated Double Sampling), signal amplification processing, AD (analog to digital) conversion processing, etc.

However, signal processing exemplified here is only one example, and the signal processing performed by the column-signal processing section 5 is not limited to the processing described above. The column-signal processing section 5 performs one or a plurality of processing out of various kinds of processing.

The column scanning section 6 includes a shift register, an address decoder, etc., and selects a unit circuit corresponding to a pixel column of the column-signal processing section 5. The column scanning section 6 performs selective scanning so that a signal having been subjected to signal processing for each unit circuit in the column-signal processing section 5 is supplied to the output processing section 7 in sequence through the horizontal signal line 10.

The output processing section 7 performs predetermined processing on the signal that has been selected by the column scanning section 6 and input through the horizontal signal line 10, and outputs the signal outside the substrate 9. The processing by the output processing section 7 sometimes includes only buffering, or may include various kinds of signal processing, such as black-level adjustment before the buffering, correction of variations for individual pixel columns, etc.

The control section 8 receives a clock signal given from the outside of the substrate 9, a data signal instructing an operation mode, etc., and includes a timing generation section that generates various timing signals on the basis of these signals. The various timing signals generated by the control section 8 are given to peripheral circuit sections, such as the row scanning section 3, the column-signal processing section 5, and the column scanning section 6, etc., and perform drive control of these circuit sections.

1.2 Configuration of Main Part

Figure 2B:
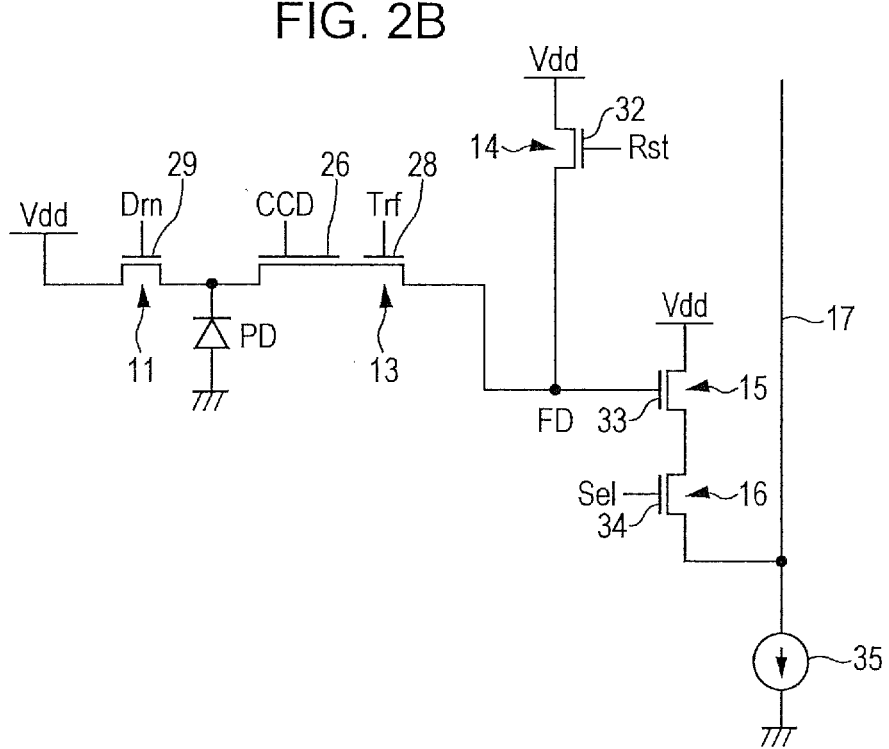

FIG. 2A illustrates a cross-sectional configuration (a part of the configuration is illustrated by a circuit diagram) of the pixel array section 2 of the solid-state imaging device 1 according to the present embodiment. FIG. 2B is a diagram illustrating a circuit configuration of a pixel of the solid-state imaging device 1 according to the present embodiment.

As illustrated in FIG. 2A and FIG. 2B, the solid-state imaging device 1 according to the present embodiment includes a photoelectric conversion section (hereinafter referred to as a photodiode PD) formed on a substrate 20, a first charge accumulation section 24, and a second charge accumulation section 25. Also, the solid-state imaging device 1 includes a transfer transistor 13 for transferring charges, a first reset transistor 11, a second reset transistor 14, an amplification transistor 15, and a selective transistor 16.

As illustrated in FIG. 2A and FIG. 2B, the substrate 20 is made of a first conductivity type, for example, an n-type semiconductor substrate. A surface of the substrate 20 on which a pixel is formed is a well region 21 made of a second conductivity type, for example, a p-type impurity region. A photodiode PD constituting a pixel, a first and a second charge accumulation sections 24 and 25, respectively, and source and drain regions constituting each pixel transistor are formed in the p-type well region 21.

The photodiode PD constitutes a photoelectric conversion element, and includes a p-type semiconductor region 22 formed on a surface of the substrate 20, and an n-type semiconductor region 23 formed in a lower layer of the p-type semiconductor region 22. In the present embodiment, a main photodiode is constituted by p-n junction between the p-type semiconductor region 22 and the n-type semiconductor region 23.

The photodiode PD generates signal charge in accordance with an amount of incident light, and the signal charges are accumulated in the n-type semiconductor region 23. Also, in the present embodiment, in the photodiode PD, the p-type semiconductor region 22 having a positive-hole accumulation layer on a surface side is formed. Accordingly, a dark current that occurs on an interface of an oxide film, not illustrated, formed on the surface side of the substrate 20 is suppressed.

The first charge accumulation section 24 is formed in an area adjacent to the photodiode PD so as to sandwich a transfer gate section 24a included in the well region 21, and includes an n-type semiconductor region formed from the surface of the substrate 20 in a depth direction. A voltage change electrode 26 is formed, through an insulating film 31, immediately on the substrate 20 in a region on which the first charge accumulation section 24 and the transfer gate section 24a are formed. And the voltage change electrode 26 is supplied with a requested voltage-change pulse CCD so that potential of the transfer gate section 24a and the first charge accumulation section 24 are changed. Thereby, the signal charges accumulated in the photodiode PD are transferred to the first charge accumulation section 24 through the gate section 24a.

In this manner, the first charge accumulation section 24 has a CCD (Charge Coupled Device) structure whose potential is changed by the voltage change electrode 26, and functions as a capacitor section (MEM) that temporarily holds signal charges. Also, a potential barrier (corresponding to the transfer gate section 24a) is disposed on the photodiode PD side of the first charge accumulation section 24.

The second charge accumulation section 25 is formed in an area adjacent to the first charge accumulation section 24 so as to sandwich a transfer gate electrode 28 constituting the transfer transistor 13, and includes an n-type semiconductor region formed from the surface side of the substrate 20. The second charge accumulation section 25 has higher impurity concentration than, for example, the n-type semiconductor region 23 included in the photodiode PD, and constitutes a so-called floating diffusion section FD.

The transfer transistor 13 includes a source made of the first charge accumulation section 24, a drain made of the second charge accumulation section 25, and the transfer gate electrode 28 formed on the substrate 20 between the source and the drain through the insulating film 31.

By supplying a transfer pulse Trf to the transfer gate electrode 28, the transfer transistor 13 transfers signal charges accumulated in the first charge accumulation section 24 to the second charge accumulation section 25.

The first reset transistor 11 includes a source made of the photodiode PD, a drain (denoted by a discharge section 30 in FIG. 2A) connected to a power source voltage Vdd, and a first reset gate electrode 29 formed between the source and the drain. By supplying a first reset pulse Drn to the first reset gate electrode 29, a voltage of the photodiode PD of the first reset transistor 11 is reset to the power source voltage Vdd.

The second reset transistor 14 includes a source made of the second charge accumulation section 25, a drain connected to the power source voltage Vdd, and a second reset gate electrode 32 formed between the source and the drain. By supplying a second reset pulse Rst to the second reset gate electrode 32, a voltage of the second charge accumulation section 25 of the second reset transistor 14 is reset to the power source voltage Vdd.

The amplification transistor 15 includes a drain to which the power source voltage Vdd is supplied, a source serving also as a drain of the selective transistor 16, and an amplification gate electrode 33 formed between the source and the gate. A voltage of the second charge accumulation section 25 is supplied to amplification gate electrode 33 of the amplification transistor 15. Thereby, a pixel signal corresponding to the voltage is output to the drain.

The selective transistor 16 includes a drain serving also as a source of the amplification transistor 15, a source connected to the vertical signal line 17, and a selective gate electrode 34 formed between the source and the drain. By supplying a selective pulse Sel to the selective gate electrode 34 of the selective transistor 16, the pixel signal is output to the vertical signal line 17. And a source follower circuit is formed by connecting the amplification transistor 15 to the vertical signal line 17 through the selective transistor 16 with a constant current source 35 connected to one end of the vertical signal line 17.

In FIG. 2A, only a circuit diagram is illustrated for the second reset transistor 14, the amplification transistor 15, and the selective transistor 16, and a cross-sectional configuration has been omitted. However, in the same manner as the other pixel transistors, the transistors include an n-channel MOS transistor. That is to say, the sources and the drains of the second reset transistor 14, the amplification transistor 15, and the selective transistor 16 are included in the n-type semiconductor regions formed on the surface of the substrate 20, respectively, and individual gate electrodes are formed on the surface of the substrate 20 through the insulating film.

1.3 Driving Method

Figure 3:
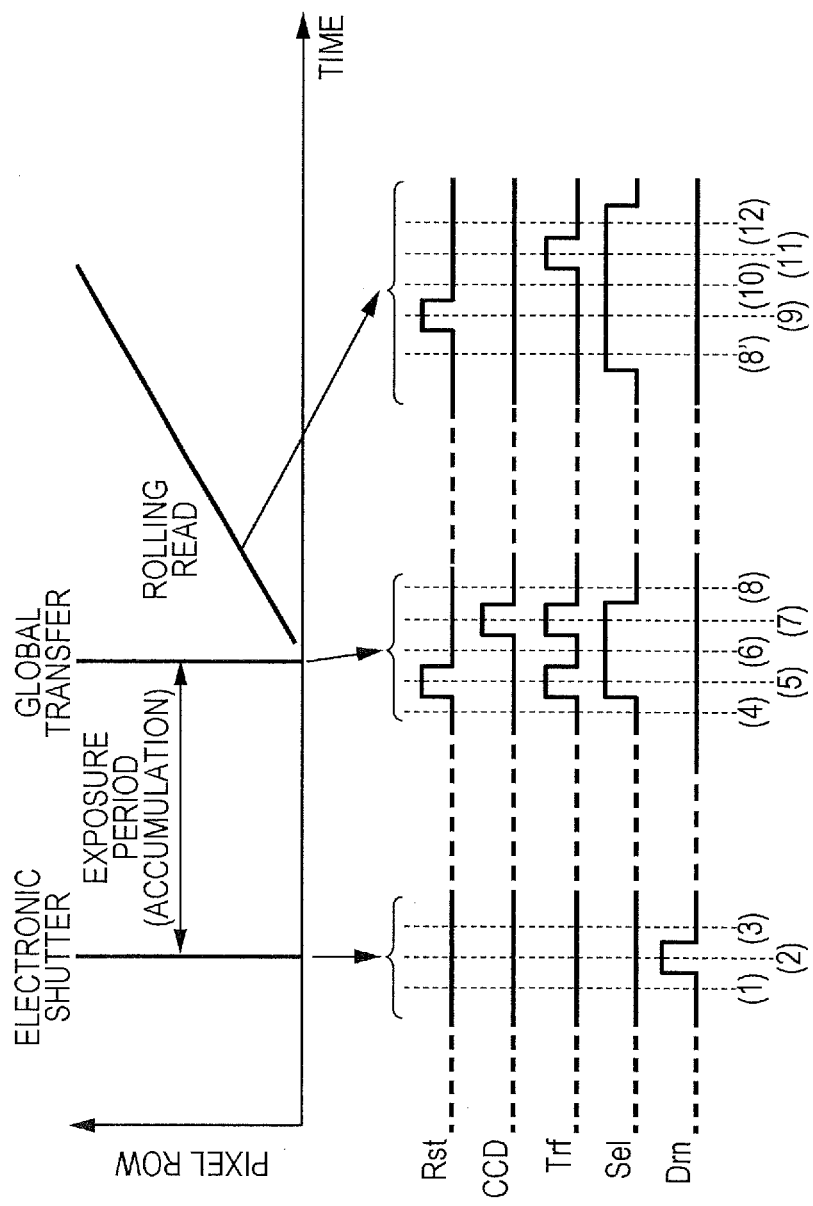
FIG. 3 is a timing chart illustrating a shooting method of a solid-state imaging device according to the first embodiment.
Figure 4:
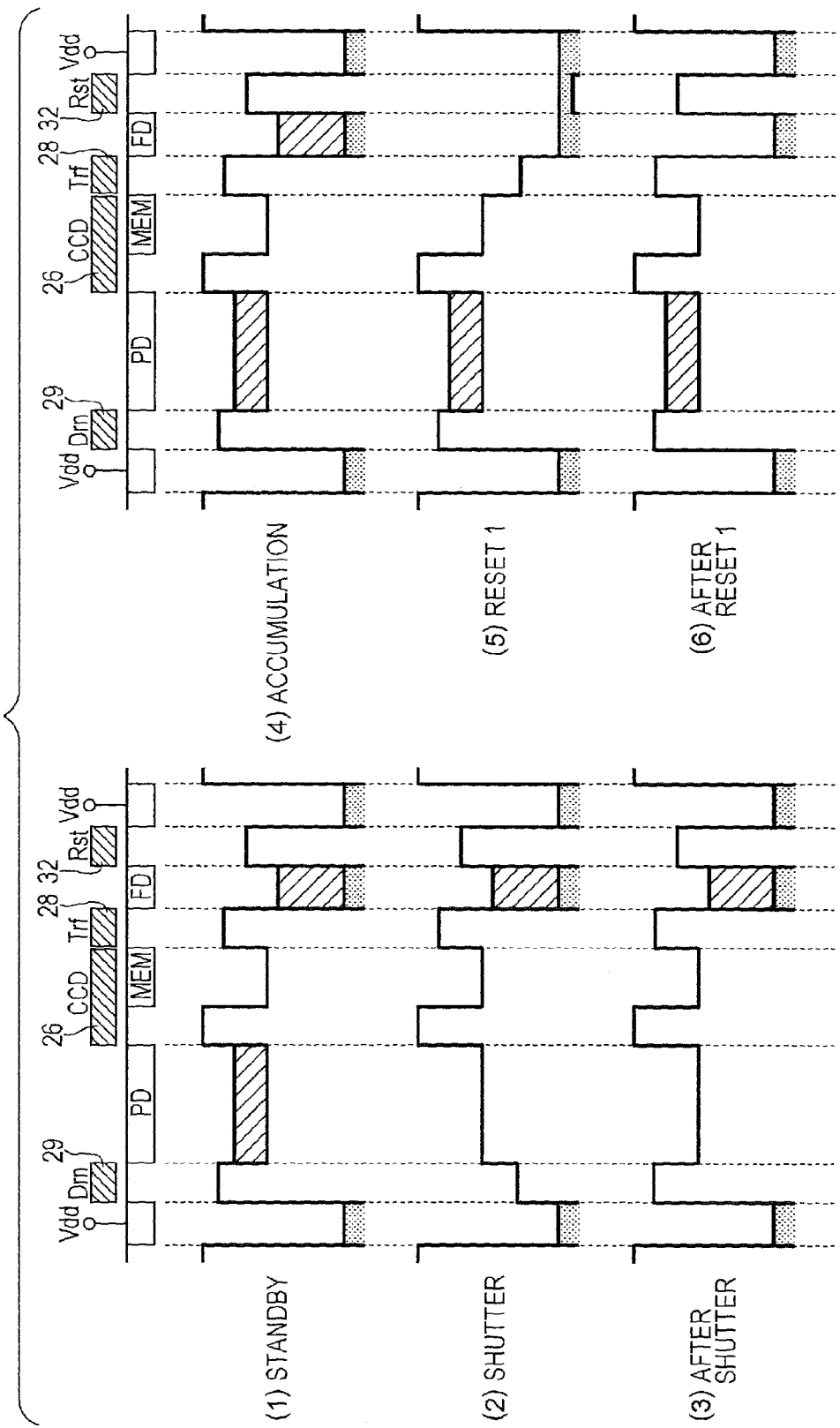
FIG. 4 is a potential diagram corresponding to the timing chart, and a cross-sectional potential diagram illustrating movement of electrons and potential transition from exposure to readout of a unit pixel (1 of 2)
Figure 5:
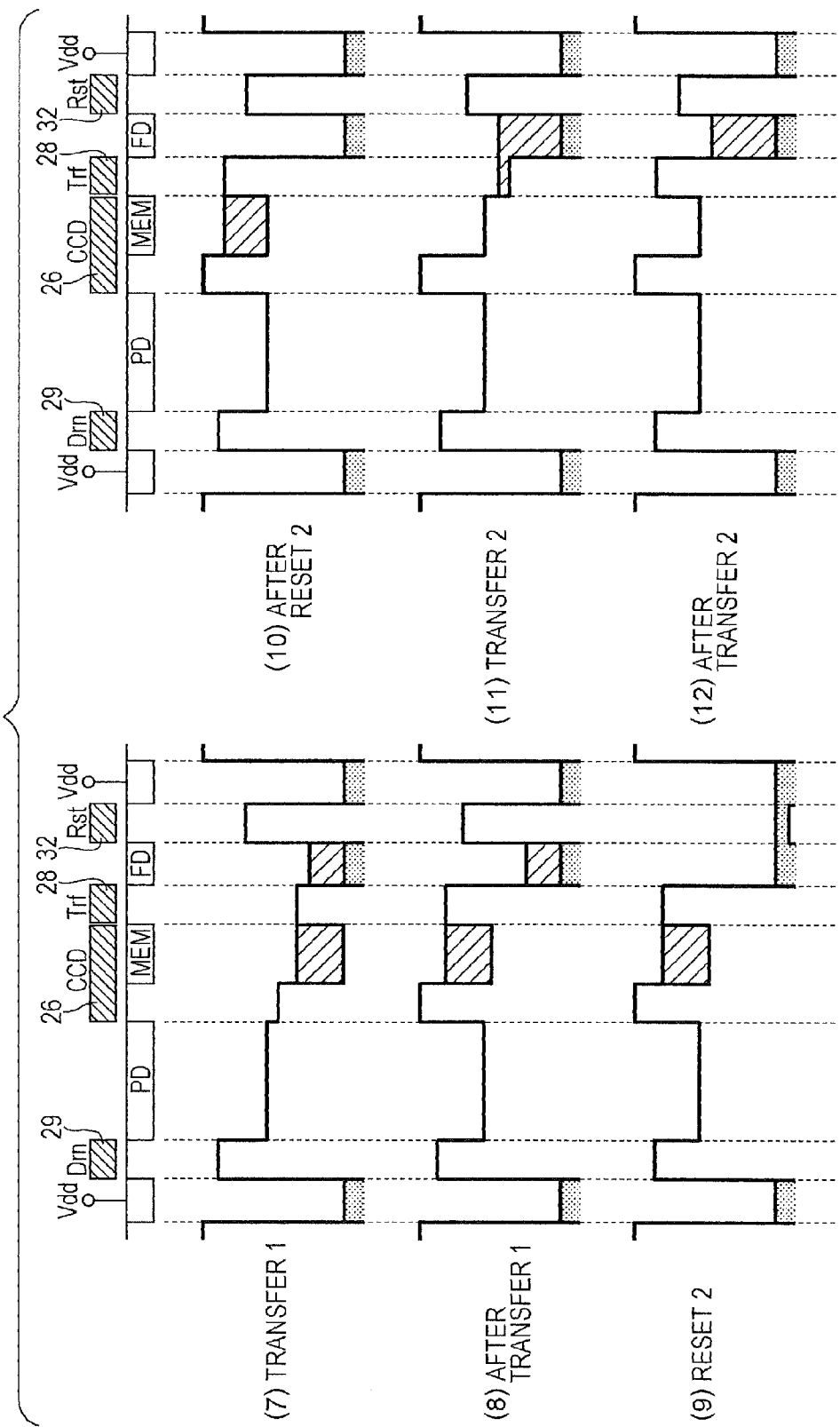
FIG. 5 is a potential diagram corresponding to the timing chart, and a cross-sectional potential diagram illustrating movement of electrons and potential transition from exposure to readout of a unit pixel (2 of 2)

Next, a description will be given of a method of driving the solid-state imaging device 1 according to the present embodiment. FIG. 3 is a timing chart illustrating a shooting method of the solid-state imaging device 1 according to the present embodiment. Also, FIG. 4 and FIG. 5 are potential diagrams corresponding to timing charts, and cross-sectional potential diagrams illustrating movement of electrons and potential transitions from exposure to readout of a unit pixel. Points in time (1) to (12) in FIG. 3 correspond to points in time (1) to (12) in FIG. 4 and FIG. 5, respectively.

First, in a standby state before starting exposure, the first reset pulse Drn, the voltage-change pulse CCD, the transfer pulse Trf, the selective pulse Sel, and the second reset pulse Rst are not supplied, and thus each gate section is in an off state (state (1) in FIG. 3). In the standby state, as illustrated in the state (1) in FIG. 4, the unit pixel is in a state in which signal charges are accumulated in the photodiode PD and the second charge accumulation section 25. At this time, the signal charges accumulated in the photodiode PD are derived from incident light after reading out a previous frame. Also, the signal charges accumulated in the second charge accumulation section 25 are a remainder from a previous frame.

Next, in order to start exposure, the first reset pulse Drn is supplied so that the first reset transistor 11 is turned on (state (2) in FIG. 3). By turning the first reset transistor 11 on, as illustrated in the state (2) in FIG. 4, the signal charges accumulated in the photodiode PD are discharged to the discharge section 30 connected to the power source voltage Vdd, and the photodiode PD is reset. After that, supplying the first reset pulse Drn is stopped so that the first reset transistor 11 is turned off (state (3) in FIG. 3). And operation of resetting the signal charges accumulated in the photodiode PD in this manner are said to be electronic shutter operation. After the first reset transistor 11 is turned off, exposure in the photodiode PD is started.

After exposure is started, in a state in which a requested exposure period has passed (state (4) in FIG. 3), as illustrated in the state (4) in FIG. 4 (4), signal charges produced by photoelectric conversion during the exposure period are accumulated in the photodiode PD. Here, a potential barrier of the reset gate section under the first reset gate electrode 29 is configured lower than that of the transfer gate section 24a under the voltage change electrode 26. Accordingly, if signal charges are generated in excess of a saturation amount of charges of the photodiode PD, overflowed signal charges from the photodiode PD are configured not to be discharged into the first charge accumulation section 24, but to be discharged into the discharge section 30 included in the first reset transistor 11. Height of the potential barrier can be controlled by impurity concentration. Specifically, the potential barrier can be lowered by introduction of n-type impurities, such as phosphorous, under the first reset gate electrode 29. In Japanese Unexamined Patent Application Publication No. 2009-268083, which is a related-art example using both the first charge accumulation section 24 and the second charge accumulation section 25 for holding charges, a high-low relationship of the potential barrier is opposite, and thus the overflowed signal charges from the photodiode PD flow into the first charge accumulation section 24.

Next, the second reset pulse Rst and the transfer pulse Trf are supplied so that the second reset transistor 14 and the transfer transistor 13 are turned on (state (5) in FIG. 3). Thereby, as illustrated in the state (5) in FIG. 4, the signal charges accumulated in the second charge accumulation section 25 are discharged to the power source voltage Vdd through the second reset transistor 14. Here, if signal charges are also accumulated in the first charge accumulation section 24, the signal charges accumulated in the first charge accumulation section 24 are also discharged to the power source voltage Vdd through the second reset transistor 14 in the same manner. And in order to bring this operation close to a subsequent rolling read state, it is desirable to supply the selective pulse Sel at the same time to turn on the selective transistor 16.

And supplying the second reset pulse Rst and the transfer pulse Trf is stopped, and thus the second reset transistor 14 and the transfer transistor 13 are turned off (state (6) in FIG. 3). Here, as illustrated in the state (6) in FIG. 4, the signal charges of the first charge accumulation section 24 and the second charge accumulation section 25 become a reset state.

Next, the voltage-change pulse CCD and the transfer pulse Trf are supplied so that the potential of the transfer gate section 24a and the first charge accumulation section 24 are set deep, and thus the transfer transistor 13 is turned on (state (7) in FIG. 3). Thereby, as illustrated in the state (7) in FIG. 5, the signal charges accumulated during exposure period photodiode PD are transferred to the first charge accumulation section 24 and the second charge accumulation section 25. Here, the first charge accumulation section 24 is not formed to be sufficiently large to accommodate all the signal charges accumulated in the photodiode PD. Accordingly, the signal charges in the photodiode PD are first transferred to the first charge accumulation section 24, and signal charges that have overflowed from the first charge accumulation section 24 is transferred to the second charge accumulation section 25 to be accumulated there.

And after transferring the signal charges, the supply of the voltage-change pulse CCD and the transfer pulse Trf is stopped, and thus the potential of the lower part of the voltage change electrode 26 is returned to the former potential, which turns off the transfer transistor 13 (state (8) in FIG. 3). At this time, if the selective pulse Sel has been supplied, the supply is stopped at the same time. And thereby, as illustrated in the state (8) in FIG. 5, the transfer of the signal charges to the first charge accumulation section 24 and to the second charge accumulation section 25 is ended.

A series of operation so far is carried out for all the pixels at the same time. That is to say, global exposure is started in the state (2) of FIG. 4, and the global transfer is carried out in the state (7) of FIG. 4 so that an exposure period is terminated for all the pixels at the same time.

Next, rolling read is carried out. At rolling read, operation is performed for each one row in sequence.

Each pixel is in a state (8) of FIG. 5 until its turn comes for the row to be operated. A description will be given of operation of pixels in the n-th row with reference to FIG. 3 and FIG. 5.

When its turn comes for the n-th row, first, the selective pulse Sel is supplied (state (8') in FIG. 3). Thereby, the selective transistor 16 becomes the on state. The potential of the transfer transistor 13 at this time is in the same state as that of the state (8) in FIG. 5. And when the selective transistor 16 is turned on, pixel output corresponding to the potential caused by the signal charges accumulated in the second charge accumulation section 25 is amplified by the amplification transistor 15 as a high luminance signal, and is output to the vertical signal line 17 through the selective transistor 16. The high luminance signal output onto the vertical signal line 17 is captured in the column circuit (not illustrated in the figure).

Next, in a state in which the selective pulse Sel is continued to be supplied, the second reset pulse Rst is supplied (state (9) in FIG. 3). Thereby, the second reset transistor 14 becomes the on state, then as illustrated in the state (9) in FIG. 5, the signal charges accumulated in the second charge accumulation section 25 are discharged to the power source voltage Vdd, and rest is carried out. After that, the supply of the second reset pulse Rst is stopped (state (10) in FIG. 3), and thus, as illustrated in the state (10) in FIG. 5, the second reset transistor 14 is turned off.

And when the second reset transistor 14 is in the off state, an output corresponding to the potential of the second charge accumulation section 25 is captured in the column circuit as a reset signal. The column circuit performs correlated double sampling by producing the difference between the high luminance signal obtained before and the reset signal. Thereby, the column circuit holds the high luminance signal from which a fixed noise pattern has been removed.

Next, in a state in which the selective pulse Sel is continued to be supplied, the transfer pulse Trf is supplied (state (11) in FIG. 3). Thereby, the transfer transistor 13 becomes the on state, then as illustrated in the state (11) in FIG. 5, the signal charges accumulated in the first charge accumulation section 24 are transferred to the second charge accumulation section 25. After the transfer is ended, the supply of the transfer pulse Trf is stopped (state (12) in FIG. 3), and as illustrated in the state (12) in FIG. 5, the transfer transistor 13 is turned off.

And in this state, an output corresponding to the potential of the signal charges accumulated in the second charge accumulation section 25 are amplified by the amplification transistor 15 as a low luminance signal, and output to the vertical signal line 17 through the selective transistor 16. The low luminance signal output onto the vertical signal line 17 is captured by the column circuit.

The column circuit performs the correlated double sampling by producing the difference between the reset signal obtained in the state of (10) in FIG. 3 and the low luminance signal. Thereby, the column circuit holds the low luminance signal from which a fixed noise pattern has been removed.

And the high luminance signal and the low luminance signal, from which fixed noise patterns have been removed and are held in the column circuit, are output to the output processing section 7 through the horizontal signal line 10. The output processing section 7 reconstructs, from the high luminance signal and the low luminance signal, a signal corresponding to the signal charges generated and accumulated by the photodiode PD during the exposure period, and outputs the signal. Thereby, reading the pixels in the n-th row is ended.

After reading the pixels in the n-th row is ended, pixels in the (n+1)-th row are read. When reading the pixels in the (n+1)-th row, the individual pixel transistors are driven in the same operation as those in the states (8') to (12) in FIG. 3, and the low luminance signal and the high luminance signal can be obtained.

In the solid-state imaging device 1 according to the present embodiment, the signal charges produced by photoelectric conversion during exposure period are accumulated only by the photodiode PD, and after the end of the exposure period, the signal charges are transferred to the first charge accumulation section 24 and the second charge accumulation section 25. Accordingly, compared with a related-art solid-state imaging device in which the signal charges are accumulated in the photodiode PD and the first charge accumulation section 24 during exposure period, it is possible to make an area of the first charge accumulation section 24 small. Thereby, if it is assumed that an area of the unit pixel is kept the same, it is possible to guarantee to have a large occupied area of the photodiode PD, and to increase sensitivity and a saturation amount of charges.

Also, in the solid-state imaging device 1 according to the present embodiment, both the low luminance signal and the high luminance signal can be read, and thus a dynamic range can be expanded.

In the present embodiment, simultaneity of electronic shutter operation with global transfer ought to be kept to an extent that there is no problem in practical use. If all the pixels are completely operated at the same time, there is much load on the driver. In order to reduce this load, a configuration of providing a small time difference between an upper part and a lower part of the pixel array section 2 may be employed.

Incidentally, using a method of driving a solid-state imaging device 1 according to the present embodiment, it becomes possible to perform the electronic shutter operation during the rolling read. In the following, as a variation, a description will be given of a driving method in which electronic shutter operation is performed during rolling read.

1.4 Variation

Figure 6:
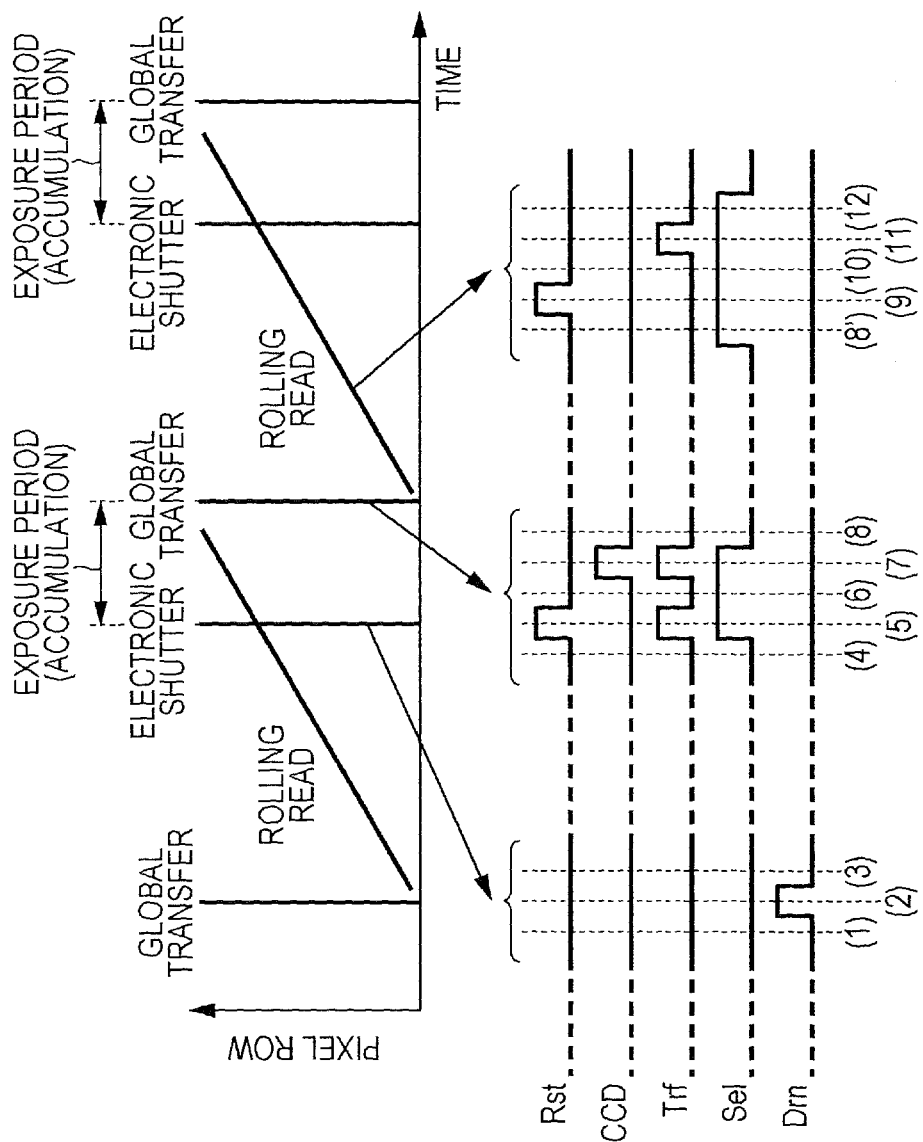
FIG. 6 is a timing chart illustrating a method of driving a solid-state imaging device according to a variation.

FIG. 6 is a timing chart illustrating a method of driving a solid-state imaging device according to a variation. In the variation, operation of an electronic shutter, operation of global transfer, and operation of each pixel at the time of rolling read are the same as those of the above-described embodiments, but timing thereof are different. The method according to the variation is effective in the case of capturing a moving image.

In the variation, as illustrated in FIG. 6, before the rolling read is completely ended, operation of the electronic shutter (state (2) in FIG. 6) is performed. That is to say, a next exposure period is started during a reading period of a previous frame. In this case, in order to minimize influences of power source fluctuations, etc., it is desirable to perform electronic shutter operation at the time of changing rows.

In the solid-state imaging device 1 according to the present embodiment, if signal charges generated by the photodiode PD during an exposure period exceed a saturation amount of charges of the photodiode PD, the signal charges overflow into the drain of the first reset transistor 11 (the discharge section 30). Accordingly, the signal charges exceeding the saturation amount of charges of the photodiode PD might not overflow into the first charge accumulation section 24 and the second charge accumulation section 25, and thus it is possible to start exposure before the rolling read is ended.

And as in the variation, the exposure is started before the rolling read is terminated, the signal charges during the exposure are accumulated only by the photodiode PD, and the global transfer is performed after the rolling read is completely ended. Thereby, the previous signal charges and the next signal charges will not be mixed in the first charge accumulation section 24 and the second charge accumulation section 25.

In the variation, exposure is started before rolling read is ended, and thus time jumps between frames become few so that a smooth moving image can be captured, and sensitivity is improved. Also, in the solid-state imaging device 1 according to the present embodiment, as described above, the generated signal charges are accumulated only in the photodiode PD, and thus it becomes possible to employ a configuration in which the photodiode PD has a large area, and the first charge accumulation section 24 has a small area. Such a configuration is effective for a driving method according to the variation.

2. Second Embodiment

Solid-State Imaging Device Electronic System

Next, descriptions will be given of a solid-state imaging device according to a second embodiment of the present disclosure, a method of driving the same, and an electronic system. An overall configuration of the solid-state imaging device according to the present embodiment is the same as that in FIG. 1, and thus a duplicated description will be omitted. In the solid-state imaging device according to the present embodiment, 2 pixels share a plurality of pixel transistors.

2.1 Pixel Configuration

Figure 7:
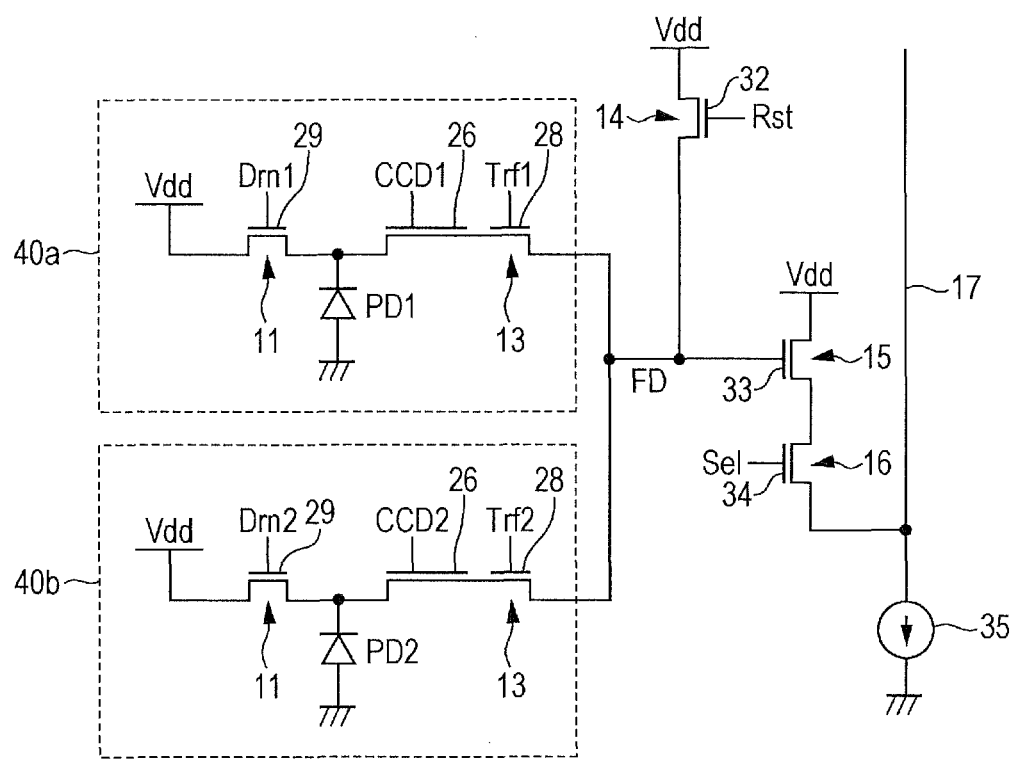
FIG. 7 is a circuit diagram illustrating a pixel configuration of a solid-state imaging device according to a second embodiment of the present disclosure.

FIG. 7 is a circuit diagram illustrating a pixel configuration of a solid-state imaging device according to the present embodiment. FIG. 7 illustrates two adjacent pixels (hereinafter referred to as a first pixel 40a and a second pixel 40b) in the column direction as a representative. In FIG. 7, a same reference numeral is given to a corresponding part in FIG. 2B, and a duplicated description will be omitted.

As illustrated in FIG. 7, in the first pixel 40a and the second pixel 40b, the photodiode PD, the first charge accumulation section 24 (refer to FIG. 2A), and the pixel transistor driving those are individually formed for each pixel. And the second charge accumulation section 25 (refer to FIG. 2A) is shared by the first pixel 40a and the second pixel 40b. And the second reset transistor 14 that resets the second charge accumulation section 25, the amplification transistor 15, and the selective transistor 16 are also shared by the first and the second pixels 40a and 40b.

In the first pixel 40a, a transfer pulse Trf1 is input into the transfer transistor 13, a first reset pulse Drn1 is input into the first reset transistor 11, and a voltage-change pulse CCD1 is input into the voltage change electrode 26.

In the second pixel 40b, a transfer pulse Trf2 is input into the transfer transistor 13, a first reset pulse Drn2 is input into the first reset transistor 11, and a voltage change pulse CCD2 is input into the voltage change electrode 26.

In order to drive a solid-state imaging device according to the present embodiment, it is necessary to use a mechanical shutter in combination when shooting a still image. Next, a description will be given of an electronic system in which the solid-state imaging device according to the present embodiment is incorporated.

2.2 Configuration of Electronic System

Figure 8:
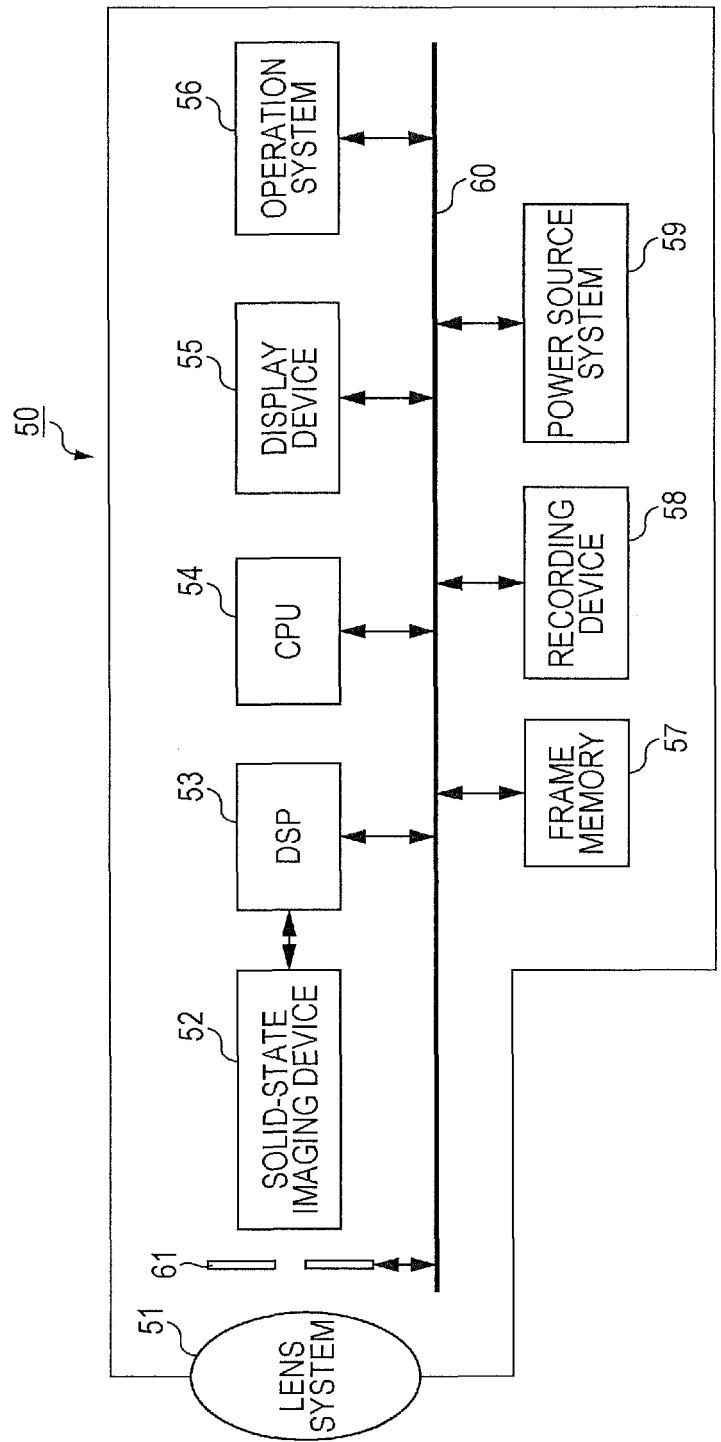
FIG. 8 is a configuration diagram in the case where a solid-state imaging device is applied to a camera as an example of an electronic system according to the present disclosure.

FIG. 8 illustrates a configuration of the case where the solid-state imaging device is applied to a camera as an example of an electronic system according to the present disclosure. An electronic system 50 according to the present embodiment includes an optical lens group (optical lens system) 51, a mechanical shutter 61, a solid-state imaging device 52, a DSP (Digital signal processor) 53, a frame memory 57, and a central processing unit (CPU) 54. Further, the electronic system 50 includes a display device 55, a recording device 58, an operation system 56, a power source system 59, etc. Among these, the DSP 53, the frame memory 57, the CPU 54, the display device 55, the recording device 58, the operation system 56 and the power source system 59 are connected to a common bus line 60.

The optical lens group 51 leads image light from a subject (incident light) onto an imaging section (pixel array section: pixel section) of the solid-state imaging device 52. The mechanical shutter 61 controls a light irradiation period and a light shielding period of the solid-state imaging device 52. A solid-state imaging device having the pixel configuration illustrated in FIG. 7 is applied to the solid-state imaging device 52. The solid-state imaging device 52 converts the image light formed by the optical lens group 51 on the imaging surface into an electronic signal for each pixel. The DSP 53 controls the solid-state imaging device 52, then receives a signal therefrom, and generates an image signal. The frame memory 57 is a memory for use in temporarily storing an image signal to be processed by the DSP 53.

The display device 55 displays an image signal output as a result of processing by the DSP 53. The recording device 58 records the image signal to, for example, a magnetic tape, a magnetic disk, an optical disc, a memory card, etc. The operation system 56 is for operating the camera. The power source system 59 applies electric power for driving the solid-state imaging device 52 and the mechanical shutter 61. The CPU 54 controls operation of these devices.

In the electronic system 50 according to the present embodiment, at the time of shooting a still image, the mechanical shutter 61 is used. And at the time of capturing a moving image, the moving image is captured without using the mechanical shutter 61. In the following, a description will be given of a specific method of driving the system.

2.3 Driving Method: Still Image

Figure 9:
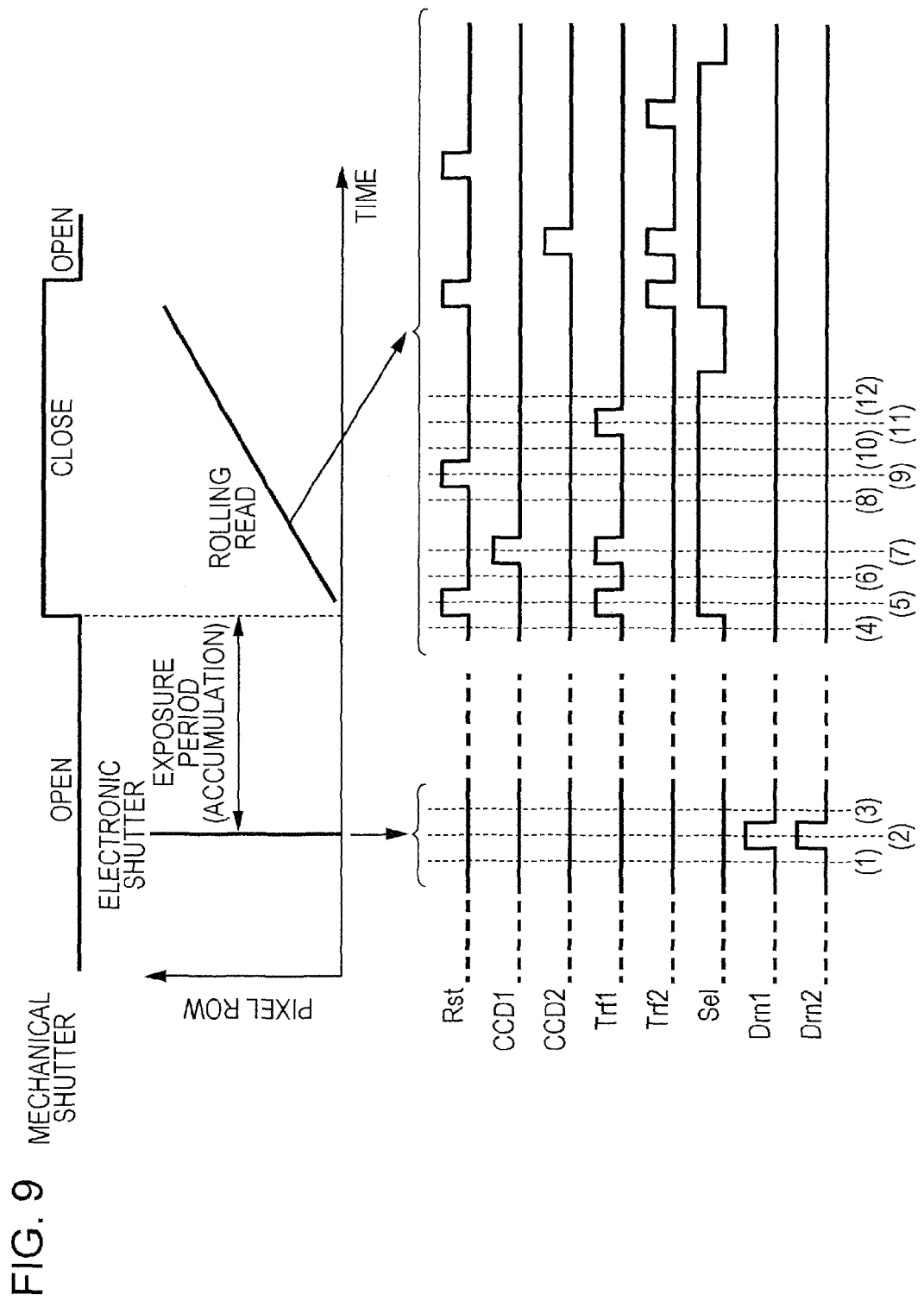
FIG. 9 is a timing chart in the case of capturing a still image by a solid-state imaging device according to the second embodiment, which is built in an electronic system.

FIG. 9 illustrates a timing chart in the case of capturing a still image by a solid-state imaging device 52 built in an electronic system 50 according to the present embodiment. Points in time (1) to (12) in FIG. 9 correspond to points in time (1) to (12) in FIG. 4 and FIG. 5, respectively. In the present embodiment, in the case of capturing a still image, the mechanical shutter 61 included in the electronic system 50 is used in combination.

First, in a state in which the mechanical shutter 61 is open, the first reset pulses Drn1 and Drn2 are supplied to all the pixels at the same time so that only the first reset transistors 11 are turned on (state (2) in FIG. 9). After that, the supply of the first reset pulses Drn1 and Drn2 to all the pixels is stopped at the same time so that the first reset transistor 11 is turned off (the state (3) in FIG. 9). Thereby, electronic shutter operation is performed for all the pixels at the same time, and thus an exposure period is started. When the exposure period is started, as illustrated in the state (4) in FIG. 4, the photodiode PD starts generation and accumulation of signal charges.

Next, the mechanical shutter 61 is closed so that the exposure periods for all the pixels are terminated at the same time. That is to say, in the first embodiment, the global transfer is performed so as to terminate an exposure period for all the pixels at the same time. However, in the present embodiment, the mechanical shutter 61 is closed so as to terminate the exposure period.

After the mechanical shutter 61 is closed, the rolling read is started. In the rolling read, first, a signal of the first pixel 40a is read. In the reading of the first pixel 40a, the signal charges accumulated in the photodiode PD are read as a high luminance signal and a low luminance signal in the same manner as the driving method according to the first embodiment as illustrated in the state (5) in FIG. 4 to the state (12) in FIG. 5. And while the signal charges of the first pixel 40a are being read, in the second pixel 40b, the generated and accumulated signal charges are kept in the photodiode PD without change.

After the reading of the first pixel 40a is ended, next, the second pixel 40b is read. The reading of the second pixel 40b is carried out in the same manner as that in the state (5) in FIG. 4 to the state (12) in FIG. 5 in the first embodiment. In the present embodiment, in this manner, in the pixels sharing a plurality of pixel transistors, signal charges are transferred to the first and the second charge accumulation sections 24 and 25, respectively, and are read in sequence.

In the present embodiment, operations from the state (4) in FIG. 4 to the state (8) in FIG. 5 are also incorporated in reading operation for each row, and thus it becomes possible to incorporate a reset signal of a pixel to be read into the column circuit. Accordingly, for the high luminance signal, it is possible to produce a difference with the reset signal obtained by the state (6) in FIG. 9 in place of the reset signal obtained by the state (10) in FIG. 9.

In the present embodiment, in the first pixel 40a and the second pixel 40b that share a plurality of pixel transistors, signal charges are transferred to the first and the second charge accumulation sections 24 and 25, respectively, and are read in sequence. Thus, the signal charges of the individual pixels are not mixed in the second charge accumulation section 25. Also, in the present embodiment, an exposure period is ended mechanically by the mechanical shutter 61, and thus after the mechanical shutter 61 is closed, incident light is mechanically shielded. Accordingly, at the time of rolling read, it becomes possible to accumulate signal charges in a pixel in the photodiode PD until the time of reading the pixel. In this regard, in the present embodiment, the mechanical shutter 61 is used only for determining timing to end an exposure period. Accordingly, for the mechanical shutter 61 used in the present embodiment, it is possible to use a simple mechanical shutter compared with a high-precision mechanical shutter that determines a start and an end of an exposure period.

2.4 Driving Method: Moving Image

Figure 10:
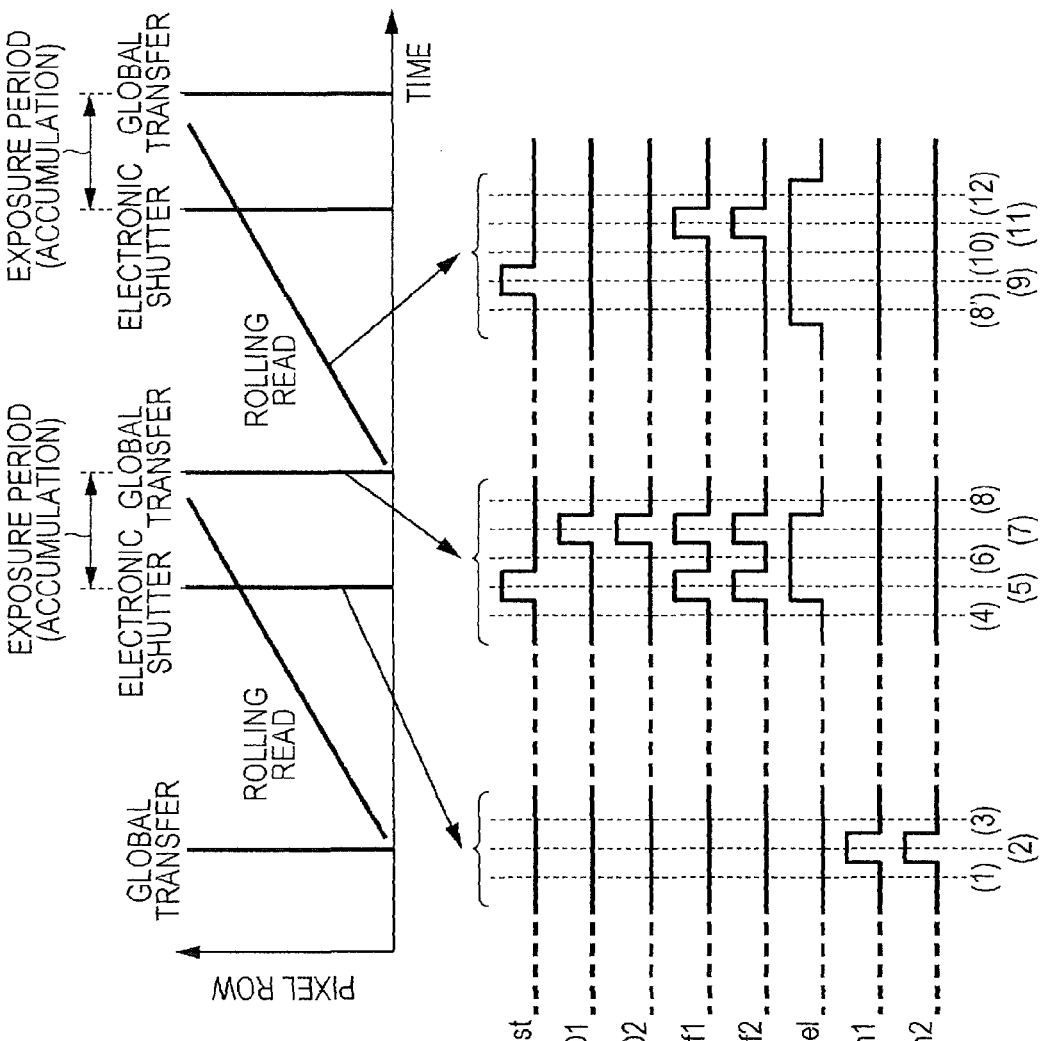
FIG. 10 is a timing chart in the case of capturing a moving image by a solid-state imaging device according to the second embodiment, which is built in an electronic system.

FIG. 10 illustrates a timing chart in the case of capturing a moving image in the solid-state imaging device according to the present embodiment. Points in time (1) to (12) in FIG. 10 correspond to points in time (1) to (12) in FIG. 4 and FIG. 5, respectively. In the present embodiment, in the case of capturing a moving image, the mechanical shutter 61 included in the electronic system 50 may not be used in combination.

In the case of capturing a moving image, electronic shutter (state (2) in FIG. 10) operation is performed for all the pixels at the same time in the same manner as the first embodiment. And after a certain exposure period is complete, by the same global transfer (states (4) to (8) in FIG. 10) as that in the first embodiment, the exposure period for all the pixels is terminated at the same time. Also, in the rolling read, the first reset pulses Drn1 and Drn2 for the first pixel 40a and the second pixel 40b, the transfer pulses Trf1 and Trf2, and the voltage change pulses CCD1 and CCD2 are operated at the same time, respectively. Thereby, signal charges for two pixels are added in the second charge accumulation section 25, and then are read. That is to say, in the case of capturing a moving image, signal charges of the first pixel 40a and the second pixel 40b are read as signal charges for one pixel.

Incidentally, a current digital still camera produces 10 megapixels or more for a still image. However, for a moving image, even a HDTV (High-Definition Television) produces only two megapixels. In this manner, for moving images, there are many applications that allow pixel addition in order to reduce a number of pixels. In the present embodiment, pixel addition is performed between shared pixels at the time of capturing a moving image. However, if sensitivity and fold-back noise can be deteriorated, in place of pixel addition, thinning read, in which only one of the shared pixels is read may by employed.

As described above, in the present embodiment, in a solid-state imaging device having a global shutter function, it is possible to share a plurality of pixel transistors among a plurality of pixels (two in the present embodiment). Accordingly, an area of a unit pixel can be made small. Also, an occupied area of a pixel transistor can be made small, thus an area of the photodiode PD in each pixel can be made large, and a saturation amount of charges can be expanded.

Incidentally, in the present embodiment, at the time of capturing a moving image, signals of pixels sharing the second charge accumulation section 25 are mixed and output.

Accordingly, the pixels sharing the second charge accumulation section 25 are necessary to be pixels corresponding to a same color with each other.

Figure 11A:
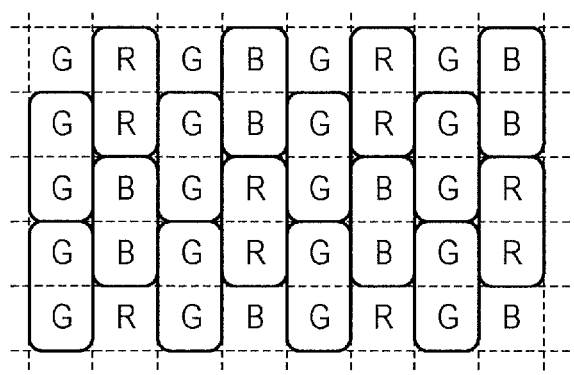
FIGS. 11A and 11B are diagrams illustrating an example of a pixel arrangement applicable to the second embodiment of the present disclosure, and an effective pixel arrangement in the case where signal charges are added among shared pixels to an actual pixel arrangement, respectively.
Figure 11B:
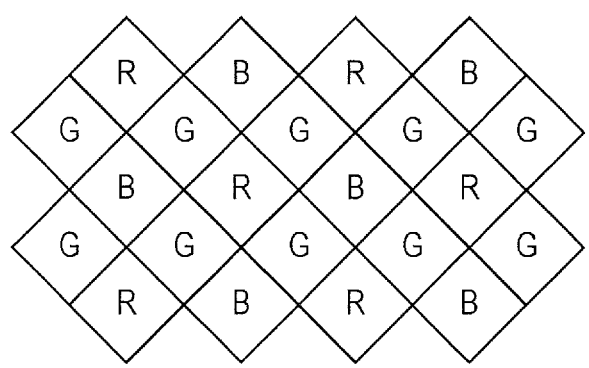

FIG. 11A illustrates an example of a pixel arrangement that can be applied to the present embodiment. FIG. 11B illustrates an effective pixel arrangement in the case of adding signal charges by the shared pixels with each other with respect to the actual pixel arrangement in FIG. 11A. FIG. 11A illustrates the example in which red pixels (R), blue pixels (B), and green pixels (G) are arranged. As illustrated in FIG. 11A, pixels in an odd-numbered column are constituted by all the green pixels, and pixels in an even-numbered column have a configuration in which red pixels and blue pixels are disposed alternately for each two rows. And a pixel configuration, in which adjacent pixels in a same color in each column share the second charge accumulation section (the second charge accumulation section 25 in FIG. 2A), is employed.

With the above-described arrangement, in the case of capturing a moving image with pixel addition, signal charges of two adjacent pixels in a same color are read all at once. And, in this case, shared pixels have a same color, and thus colors are not mixed. In this manner, pixels in a same color share a plurality of pixel transistors including the second charge accumulation section 25 so that it is possible to obtain a sufficient number of pixels for capturing a moving image even the number of the pixel decreased. Also, an exposure period at the time of capturing a moving image can be set for each pixel. Accordingly, if accumulation time periods of signal charges of two shared pixels are set different with each other, it is possible to expand a dynamic range in a 45-degree diagonal Bayer arrangement at the time of capturing a moving image.

FIG. 11A illustrates an arrangement in which the pixel arrangement becomes a diagonal Bayer arrangement at the time of capturing a moving image. It is also possible to set the arrangement in FIG. 11B to be a Bayer arrangement by rotating the arrangement in FIG. 11A 45 degrees.

Figure 12:
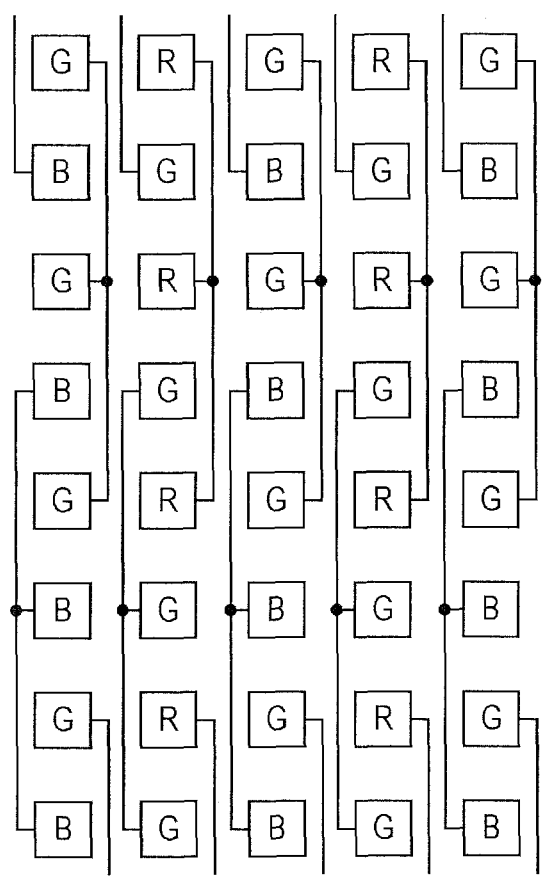
FIG. 12 is an example of a pixel arrangement applicable to a case where three pixels share a second charge accumulation section, and a plurality of pixel transistors.

In the present embodiment, a description has been given of the case where two pixels share the second charge accumulation section 25 and a plurality of pixel transistors. However, it is possible for two pixels or more to share the above elements. FIG. 12 illustrates an example of a pixel arrangement to the case where three pixels share the second charge accumulation section 25 and a plurality of pixel transistors.

As illustrated in FIG. 12, the pixel arrangement is a normal Bayer arrangement, and three adjacent pixels in same color in the vertical direction (in the row direction) are put into a sharing unit. That is to say, pixels connected by a wire line in FIG. 12 become shared pixels with each other.

In the present embodiment, shared pixels are constituted by pixels in a same color, and thus color mixture does not occur at the time of capturing a moving image. Also, in the arrangement in FIG. 12, if pixels for three columns are added in the lateral direction (in the column direction) by the column circuit, etc., in addition to addition of three pixels in the vertical direction, it is possible to reconfigure a Bayer arrangement having ⅑ the number of pixels. In this case, in the case where the number of pixels is about 18 megapixels, it is possible to capture a moving image having two megapixels, and thus it is possible to ensure sufficient number of pixels for capturing a moving image.

As described above, in the present embodiment, in a solid-state imaging device having a global shutter function with a configuration of sharing a plurality of pixel transistors by a plurality of pixels, it becomes possible to use a global shutter for capturing both a moving image and a still image using a mechanical shutter 61 at the same time. Also, in the present embodiment, it is not necessary to have an expensive high-precision mechanical shutter, and thus it is possible to reduce cost.

The present disclosure is not limited to be applied to a solid-state imaging device that detects distribution of an amount of visible incident light in order to capture an image. The present disclosure can be applied to a solid-state imaging device that captures distribution of an amount of incidence, such as infrared rays, or X-rays, or particles, etc. The present disclosure can also be applied to, in a broad sense, a solid-state imaging device (physical-quantity distribution detection apparatus) in general, such as a fingerprint detection sensor that detects distribution of the other physical quantities, for example, pressure, electrostatic capacitance, etc., to capture an image.

Further, the present disclosure is not limited to a solid-state imaging device in which individual unit pixels in a pixel area are scanned for each row in sequence, and pixel signals are read from the individual unit pixels. The present disclosure can also be applied to an X-Y addressing-type solid-state imaging device in which any one of the pixels is selected for each pixel, and a signal is read from the selected pixel.

In this regard, the solid-state imaging device may be formed in one chip, or may be formed in a module configuration in which a pixel area, and a signal processing section or an optical lens system are packaged together to have a function of capturing images.

Also, a solid-state imaging device according to the present disclosure is mainly configured by n-channel MOS transistors. However, it is also possible to configure the device by p-channel MOS transistors.

In the case of using p-channel MOS transistors, a configuration of inverting the conductivity types is employed in the individual diagrams.

Also, in the present disclosure, a description has been given of a camera as an example of an electronic system. However, as an electronic system, an electronic system having a function of capturing images, such as a mobile phone, or the like is given in addition to a camera system, such as a digital still camera, a video camera, etc. In this regard, the present disclosure may be sometimes applied to a module having the above-described functions, mounted on an electronic system, that is to say, to a camera module.

Also, in the present disclosure, descriptions have been given of only the case where a solid-state imaging device according to the second embodiment is applied to an electronic system. However, it is, of course, possible to apply a solid-state imaging device according to the first embodiment to an electronic system. In that case, a mechanical shutter may not be used in combination.

In this regard, the present disclosure can to configured as follows.

(1) A solid-state imaging device including:
a pixel array section including an array of pixels in a two-dimensional matrix,
the pixels including
a photoelectric conversion section configured to generate signal charges in accordance with an amount of light,
a discharge section configured to receive an overflow of signal charges exceeding a saturation amount of charges in the photoelectric conversion section out of the signal charges generated by the photoelectric conversion section during an exposure period,
at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges, and a plurality of pixel transistors transferring and reading the signal charges; and a scanning section configured to the scan pixels so that accumulation periods for all the pixels are simultaneous in an accumulation period of the signal charges, and to selectively scan the pixels in sequence.

(2) The solid-state imaging device according to (1), wherein a potential barrier between the photoelectric conversion section and the discharge section is formed to be lower than a potential barrier between the photoelectric conversion section and the first charge accumulation section.

(3) The solid-state imaging device according to (1) or (2), wherein the first charge accumulation section has a CCD structure.

(4) A method of driving a solid-state imaging device including a pixel array section including an array of pixels in a two-dimensional matrix, the pixels including a photoelectric conversion section configured to generate signal charges in accordance with an amount of light, a discharge section configured to receive an overflow of signal charges exceeding a saturation amount of charges in the photoelectric conversion section out of the signal charges generated by the photoelectric conversion section during an exposure period, at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges, and a plurality of pixel transistors transferring and reading the signal charges, the method including:

starting exposure by the photoelectric conversion section simultaneously for all the pixels, and generating and accumulating signal charges;

transferring the signal charges accumulated in the photoelectric conversion section to the first charge accumulation section simultaneously for all the pixels;

reading out the signal charges transferred to the second charge accumulation section in excess of the saturation amount of charges in the first charge accumulation section as a high luminance signal, resetting potential of the second charge accumulation section, and then transferring the signal charges accumulated in the first charge accumulation section to the second charge accumulation section, and reading out the signal charges accumulated in the second charge accumulation section as a low luminance signal for each pixel.

(5) The method of driving a solid-state imaging device according to (4), wherein the exposure period is started by discharging the accumulated signal charges in the photoelectric conversion section to the discharge section.

(6) The method of driving a solid-state imaging device according to (4) or (5), further including, after reading out the high luminance signal, and resetting the potential of the second charge accumulation section, obtaining a reset potential of the second charge accumulation section, and eliminating fixed pattern noise of the high luminance signal and the low luminance signal using the reset signal.

(7) The method of driving a solid-state imaging device according to any one of (4) to (6), wherein the exposure period is started before the reading out of the signal charges for each of the pixels is ended.

(8) An electronic system including a solid-state imaging device including:

a pixel array section including an array of pixels in a two-dimensional matrix, the pixels including a photoelectric conversion section configured to generate signal charges in accordance with an amount of light, a discharge section configured to receive an overflow of signal charges exceeding a saturation amount of charges in the photoelectric conversion section out of the signal charges generated by the photoelectric conversion section during an exposure period, at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges, and a plurality of pixel transistors transferring and reading the signal charges; and a scanning section configured to the scan pixels so that accumulation periods for all the pixels are simultaneous in an accumulation period of the signal charges, and to selectively scan the pixels in sequence.

The present disclosure contains subject matter related to that disclosed in Japanese Priority Patent Application JP 2011-137652 filed in the Japan Patent Office on Jun. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel array section including an array of pixels in a two-dimensional matrix,
the pixels including
a photoelectric conversion section configured to generate signal charges in accordance with an amount of light,
a discharge section configured to receive an overflow of signal charges exceeding a saturation amount of charges in the photoelectric conversion section out of the signal charges generated by the photoelectric conversion section during an exposure period,
at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges in response to a first transfer pulse having a first potential and a voltage-change pulse simultaneously after the exposure period, and to subsequently receive transfer of the remaining signal charges from the first charge accumulation section in response to a second transfer pulse having the first potential, and
a plurality of pixel transistors transferring and reading the signal charges; and
a scanning section configured to scan the pixels so that accumulation periods for all the pixels are simultaneous in an accumulation period of the signal charges, and to selectively scan the pixels in sequence.

2. The solid-state imaging device according to claim 1, wherein a potential barrier between the photoelectric conversion section and the discharge section is formed to be lower than a potential barrier between the photoelectric conversion section and the first charge accumulation section.

3. The solid-state imaging device according to claim 2, wherein the first charge accumulation section has a CCD structure.

4. The solid-state imaging device according to claim 1, wherein the pixels include a first pixel and a second pixel, and the plurality of pixel transistors is shared by the first and second pixel.

5. The solid-state imaging device according to claim 1, further comprising an electronic shutter.

6. A method of driving a solid-state imaging device including a pixel array section including an array of pixels in a two-dimensional matrix, the pixels including
   a photoelectric conversion section configured to generate signal charges in accordance with an amount of light,
   a discharge section configured to receive an overflow of signal charges exceeding a saturation amount of charges in the photoelectric conversion section out of the signal charges generated by the photoelectric conversion section during an exposure period,
   at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges in response to a first transfer pulse having a first potential and a voltage-change pulse simultaneously after the exposure period, and to subsequently receive transfer of the remaining signal charges from the first charge accumulation section in response to a second transfer pulse having the first potential, and
   a plurality of pixel transistors transferring and reading the signal charges, the method comprising:
      starting exposure by the photoelectric conversion section simultaneously for all the pixels, and generating and accumulating the signal charges;
      transferring the signal charges accumulated in the photoelectric conversion section to the first charge accumulation section simultaneously for all the pixels;
      reading out the signal charges transferred to the second charge accumulation section in excess of the saturation amount of charges in the first charge accumulation section as a high luminance signal, resetting potential of the second charge accumulation section, and then transferring the signal charges accumulated in the first charge accumulation section to the second charge accumulation section, and reading out the signal charges accumulated in the second charge accumulation section as a low luminance signal for each pixel.

7. The method of driving a solid-state imaging device according to claim 6, wherein the exposure period is started by discharging the accumulated signal charges in the photoelectric conversion section to the discharge section.

8. The method of driving a solid-state imaging device according to claim 7, further comprising, after reading out the high luminance signal, and resetting the potential of the second charge accumulation section, obtaining a reset potential of the second charge accumulation section, and eliminating fixed pattern noise of the high luminance signal and the low luminance signal using the reset signal.

9. The method of driving a solid-state imaging device according to claim 8, wherein the exposure period is started before the reading out of the signal charges for each of the pixels is ended.

10. The method of driving a solid-state imaging device according to claim 6, wherein the pixels include a first pixel and a second pixel, and the plurality of pixel transistors is shared by the first and second pixel.

11. The method of driving a solid-state imaging device according to claim 6, the solid-state imaging device further comprising an electronic shutter.

12. An electronic system including a solid-state imaging device comprising:
   a pixel array section including an array of pixels in a two-dimensional matrix,
   the pixels including
      a photoelectric conversion section configured to generate signal charges in accordance with an amount of light,
      a discharge section configured to receive an overflow of signal charges exceeding a saturation amount of charges in the photoelectric conversion section out of the signal charges generated by the photoelectric conversion section during an exposure period,
      at least two charge accumulation sections including a first charge accumulation section configured to receive transfer of the signal charges generated by the photoelectric conversion section after the exposure period, and a second charge accumulation section configured to receive transfer of the signal charges exceeding the saturation amount of charges in response to a first transfer pulse having a first potential and a voltage-change pulse simultaneously after the exposure period, and to subsequently receive transfer of the remaining signal charges from the first charge accumulation section in response to a second transfer pulse having the first potential, and
      a plurality of pixel transistors transferring and reading the signal charges; and
   a scanning section configured to scan the pixels so that accumulation periods for all the pixels are simultaneous in an accumulation period of the signal charges, and to selectively scan the pixels in sequence.

13. The electronic system according to claim 12, wherein a potential barrier between the photoelectric conversion section and the discharge section is formed to be lower than a potential barrier between the photoelectric conversion section and the first charge accumulation section.

14. The electronic system according to claim 13, wherein the first charge accumulation section has a CCD structure.

15. The electronic system according to claim 12, wherein the pixels include a first pixel and a second pixel, and the plurality of pixel transistors is shared by the first and second pixel.

16. The electronic system according to claim 12, further comprising an electronic shutter.

* * * * *